(12) United States Patent
Hechenblaikner et al.

(10) Patent No.: US 10,161,472 B2
(45) Date of Patent: Dec. 25, 2018

(54) AIR SPRING COMPONENT

(71) Applicant: Vibracoustic GmbH, Darmstadt (DE)

(72) Inventors: Joerg Hechenblaikner, Salzhausen (DE); Oliver Langowski, Hamburg (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 15/102,878

(22) PCT Filed: Nov. 25, 2014

(86) PCT No.: PCT/EP2014/075576
§ 371 (c)(1),
(2) Date: Jun. 9, 2016

(87) PCT Pub. No.: WO2015/086315
PCT Pub. Date: Jun. 18, 2015

(65) Prior Publication Data
US 2016/0305504 A1 Oct. 20, 2016

(30) Foreign Application Priority Data
Dec. 10, 2013 (DE) .......... 10 2013 113 737

(51) Int. Cl.
*F16F 9/04* (2006.01)
*F16F 9/05* (2006.01)
*B60G 11/27* (2006.01)

(52) U.S. Cl.
CPC .............. *F16F 9/052* (2013.01); *B60G 11/27* (2013.01); *F16F 9/057* (2013.01); *B60G 2206/424* (2013.01); *B60G 2206/821* (2013.01); *B60G 2206/82013* (2013.01); *F16F 2226/042* (2013.01); *F16F 2226/048* (2013.01)

(58) Field of Classification Search
CPC .......... F16F 9/052; F16F 9/057; B60G 11/27; B60G 15/12
USPC ........................ 267/64.23–64.27, 120, 124
See application file for complete search history.

(56) References Cited

U.S. PATENT DOCUMENTS

| | | | | |
|---|---|---|---|---|
| 4,787,606 A * | 11/1988 | Geno | ............... | F16F 9/0463 267/64.24 |
| 4,787,607 A * | 11/1988 | Geno | ............... | F16F 9/0454 267/64.11 |
| 4,854,555 A * | 8/1989 | Ohkawa | ............... | F16F 9/0472 267/122 |
| 5,180,145 A * | 1/1993 | Watanabe | ............... | F16F 9/103 188/267.1 |
| 5,298,713 A | 3/1994 | Pascal | | |

(Continued)

FOREIGN PATENT DOCUMENTS

| CN | 101469753 A | 7/2009 |
|---|---|---|
| CN | 102574437 A | 7/2012 |

(Continued)

*Primary Examiner* — Christopher P Schwartz
(74) *Attorney, Agent, or Firm* — Leydig, Voit & Mayer, Ltd.

(57) ABSTRACT

An air spring component includes at least two parts, which have corresponding joining areas. The joining areas are connected to one another in an adhesive-bonded manner in an inert atmosphere. The air spring component can be a rolling piston, a supplementary volume container for the rolling piston or an air spring pot.

16 Claims, 8 Drawing Sheets

(56) References Cited

U.S. PATENT DOCUMENTS

| | | | | |
|---|---|---|---|---|
| 5,332,070 | A | * | 7/1994 | Davis .................... F16F 9/16 |
| | | | | 188/280 |
| 5,449,150 | A | * | 9/1995 | Watanabe ............. B60G 15/12 |
| | | | | 188/267.1 |
| 5,601,164 | A | * | 2/1997 | Ohsaki ................ B60G 17/002 |
| | | | | 188/264 CC |
| 6,536,749 | B1 | * | 3/2003 | Luhmann ............... B60G 15/12 |
| | | | | 267/220 |
| 7,802,776 | B2 | * | 9/2010 | Behmenburg ..... B60G 17/0485 |
| | | | | 188/298 |
| 8,006,963 | B2 | * | 8/2011 | Gleu ...................... F16F 9/055 |
| | | | | 267/64.19 |
| 8,186,657 | B2 | | 5/2012 | Leonard |
| 2005/0194726 | A1 | * | 9/2005 | Klatt ..................... B60G 11/27 |
| | | | | 267/64.24 |
| 2005/0236748 | A1 | * | 10/2005 | Gross ..................... F16F 9/057 |
| | | | | 267/64.27 |
| 2006/0207846 | A1 | * | 9/2006 | Krauss ................. F16F 9/0209 |
| | | | | 188/314 |
| 2010/0127438 | A1 | * | 5/2010 | Eise ....................... F16F 9/057 |
| | | | | 267/124 |
| 2010/0147459 | A1 | | 6/2010 | Nathrop et al. |
| 2012/0153550 | A1 | | 6/2012 | Sigirtmac et al. |
| 2013/0147099 | A1 | | 6/2013 | Eike et al. |
| 2014/0027962 | A1 | * | 1/2014 | Behmenburg ........ F16F 9/0409 |
| | | | | 267/64.27 |
| 2014/0054833 | A1 | * | 2/2014 | Neitzel .................. B60G 11/27 |
| | | | | 267/64.27 |
| 2014/0252743 | A1 | | 9/2014 | Pielock |
| 2015/0210138 | A1 | * | 7/2015 | Job ........................ B60G 15/14 |
| | | | | 267/64.24 |

FOREIGN PATENT DOCUMENTS

| | | |
|---|---|---|
| DE | 3609775 A1 | 11/1986 |
| DE | 102007026163 A1 | 12/2008 |
| DE | 102007035640 A1 | 1/2009 |
| DE | 102011050103 A1 | 11/2012 |
| DE | 102012200388 A1 | 4/2013 |
| EP | 1415789 B1 | 5/2004 |
| EP | 1589253 A1 | 10/2005 |
| EP | 1862335 B1 | 4/2010 |
| JP | H 05094547 U | 12/1993 |
| JP | H 08230044 A | 9/1996 |
| JP | 2005231172 A | 9/2005 |
| JP | 2007313792 A | 12/2007 |
| JP | 2009127682 A | 6/2009 |
| WO | WO 9846370 A1 | 10/1998 |

* cited by examiner

AIR SPRING COMPONENT

CROSS-REFERENCE TO PRIOR APPLICATIONS

This application is a U.S. National Stage Application under 35 U.S.C. § 371 of International Application No. PCT/EP2014/075576 filed on Nov. 25, 2014, and claims benefit to German Patent Application No. DE 10 2013 113 737.7 filed on Dec. 10, 2013. The International Application was published in German on Jun. 18, 2015 as WO 2015/086315 A1 under PCT Article 21(2).

FIELD

The present invention relates to an air spring component, in particular a rolling piston, to a supplementary volume container for a rolling piston or an air spring pot.

BACKGROUND

Air springs are used to cushion two vehicle parts that can move relative to one another, but also to modify the level of a vehicle. Typical air springs have an air-filled air spring bellows made of rubber, which is closed airtightly by means of an upper closure element and a rolling piston. The closure element and the rolling piston are also referred to as air spring components. When subjected to a load, the air spring bellows rolls along the outer surface of the rolling piston. The rolling piston is furthermore used to attach the air spring to a vehicle part.

The spring action of air springs is based on the compressibility of air. Thus, the spring hardness is dependent on the volume of the enclosed air and the pressure thereof. The level can be set by changing the air quantity.

The properties of the air spring can be improved by enlarging the available volume. An enlargement of the volume can generally be achieved by making the air spring components of a corresponding size. Since the available installation space for the air spring components is often very restricted, they must often be embodied in several parts to make good use of the volume.

Moreover, multi-part configuration of the air spring components is necessary simply for manufacturing reasons. This is because air spring components are nowadays generally produced from plastic by injection molding or centrifugal molding for reasons of weight and cost. To increase the rigidity and load bearing capacity of a rolling piston manufactured from plastic, however, internal reinforcing ribs are often required. In the case of air spring components produced as a single part, the reentrant angles formed in this case make removal from the mold completely impossible in most cases, or possible only with difficulty. A multi-part configuration of the air spring component is therefore required.

However, a two-part or multi-part configuration has the disadvantage that special design measures must be taken for sealing and for connecting the individual parts in a manner which prevents loss. In particular, care must be taken to ensure that there is adequate leaktightness at the joint between the two individual parts in order to ensure correct operation of the air spring.

SUMMARY

In an embodiment, the present invention provides an air spring component. The air spring component includes at least two parts, which have corresponding joining areas. The joining areas are connected to one another in an adhesive-bonded manner in an inert atmosphere. The air spring component can be a rolling piston, a supplementary volume container for the rolling piston or an air spring pot.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides an air spring component, in particular a pressurized air spring component which, despite being in several parts, has adequate leaktightness, component strength, temperature stability and aging resistance and, at the same time, is economical to produce.

The air spring component according to an embodiment of the invention comprises at least two parts, which have corresponding joining areas, wherein the joining areas are connected to one another in an adhesive-bonded manner in an inert atmosphere. The adhesive bond preferably involves the formation of a weld seam. Connecting the two parts in an adhesive-bonded manner in an inert atmosphere makes it possible to produce a pressurized air spring component consisting of a plurality of parts which has adequate leaktightness, strength, temperature stability and aging resistance in the region of the joining area. Furthermore, connection in an adhesive-bonded manner in an inert atmosphere ensures a large degree of design freedom in the joining areas or at the connection points. The joining areas can be arranged both on the outer circumference, in particular in the edge sections of the part, and in the interior of the part. Furthermore, the joining areas can be of flat configuration, but can also have a three-dimensional configuration. Moreover, it is advantageous that no finish machining of the joining areas is required before joining. In addition, the inert atmosphere provides protection against contamination of the joining areas since oxidation and/or reaction of the zones to be joined is prevented. As a result, the weld seam has a high strength and leaktightness.

In an advantageous embodiment, the adhesive bond is accomplished by heating and/or fusing and subsequently pressing together of joining areas in an inert atmosphere. A weld seam is preferably formed during this process. It is advantageous to use nitrogen as the inert atmosphere. It is furthermore advantageous if the inert atmosphere is produced in an enclosure.

The joining areas can furthermore be connected to one another by means of hot gas welding. By means of hot gas welding, parts made of plastic, in particular of glass fiber reinforced plastic, can be connected in an adhesive-bonded manner in such a way that the requirements for pressurized air spring components, such as leaktightness, component strength, temperature stability and/or aging resistance, are met. In hot gas welding, the two parts to be joined, in particular the joining areas thereof, are heated and/or fused or plasticized by means of hot gas and then joined under pressure. In the case of hot gas welding, heating or plasticization takes place by means of hot gas, without contact. Here, it is advantageous if the hot gas forms the inert atmosphere. It is furthermore advantageous if nitrogen is used as the hot gas in the hot gas welding process. Through the use of nitrogen as the working gas, the parts are protected from oxidation and/or reaction during the heating or plasticization.

In the case of hot gas welding, the parts to be joined are held in fixtures and positioned spaced apart. The joining regions are then softened and/or fused or plasticized by means of a hot gas, in particular nitrogen. It is advantageous if the hot gas is applied to the joining areas via nozzles. After this, the two parts or the heated or plasticized joining areas are pressed together under pressure. Holding this position and cooling the heated or plasticized joining areas leads, through solidification, to adhesive bond between the two parts, with the formation of a weld seam.

In an advantageous embodiment, heating is accomplished by means of infrared radiation, mirror heating and/or induction. It is advantageous if heating is performed either under a vacuum or with the use of an inert working gas, in particular nitrogen, in a corresponding enclosure.

In an advantageous embodiment, the joining areas are formed from corresponding edge sections, ribs and/or webs of the parts. The ribs and/or webs ensure that the parts or the air spring component are/is sufficiently stable and rigid.

It is advantageous if the ribs and/or webs project radially inward and/or outward from a housing wall of the parts. This enables the part to be configured in such a way that the joining area or connection point is arranged both on the outer circumference and on the inner circumference of the part.

The webs and/or ribs can have an approximately T-shaped basic shape. It is thereby possible to enlarge the surface area of the joining areas.

It is furthermore advantageous if fusible projections are provided on the joining areas. In this case, the joining areas can be produced directly during the injection molding process. Furthermore, the joining areas can be flat, but they can also have a three-dimensional configuration. The fusible projections are heated and/or plasticized or fused either by means of hot gas, infrared radiation, mirror heating and/or induction and form a weld seam through pressure and solidification.

Furthermore, at least one of the parts can have a weld seam covering, which covers a joint. It is advantageous if the weld seam covering is configured as an encircling covering lip. Here, the covering lip protrudes from one of the parts, preferably from the housing wall thereof. During the pressing together of the two parts, the covering lip makes contact with the other part or the housing wall thereof and, as a result, covers the joint. Thus, the covering lip prevents the plasticized or fused joining areas from escaping during the pressing operation. As a result, it is no longer necessary to finish machine the weld in an expensive process since a clean outer surface of the air spring component is created.

In an advantageous embodiment, the weld seam covering protrudes from the first part and rests in a corresponding recess on the second part. It is advantageous if the weld seam covering is configured as a covering lip that tapers to a point and engages in a corresponding bevel on the opposite or second part during the pressing operation. A very largely smooth outer surface is thereby advantageously created.

In an advantageous embodiment, the air spring component has a bottom part and a top part, which are connected in an adhesive-bonded manner to form an air spring pot. It is furthermore advantageous if the parts are connected in an adhesive-bonded manner in an inert atmosphere, preferably by means of hot gas welding.

The air spring component can furthermore have a bottom part, a top part and a dividing wall arranged therebetween, wherein the top part and the bottom part are connected in an adhesive-bonded manner by means of the dividing wall to form a supplementary volume container. The parts can be connected in an adhesive-bonded manner in an inert atmosphere, preferably by means of hot gas welding. The dividing wall advantageously divides the supplementary volume container into a plurality of switching volumes, which can be controlled by means of switching valves integrated into the bottom part and the top part. It is thereby possible to vary the air spring stiffness. The air spring component configured as a supplementary volume container can furthermore have a plurality of dividing walls, which allow subdivision into a plurality of chambers.

In an advantageous embodiment, the air spring component has a top part and a rolling piston part, which are connected in an adhesive-bonded manner to form a rolling piston. It is advantageous if the parts are connected in an adhesive-bonded manner in an inert atmosphere, preferably by means of hot gas welding. The rolling piston, in particular the rolling piston part, can be embodied with a double wall in order in this way to form an air-filled chamber that can be connected to a chamber of the supplementary volume container. A larger switching volume and, associated with this, wide variation of the air spring stiffness is thereby made possible. It is advantageous if the rolling piston is configured in such a way that a damper can be accommodated.

The supplementary volume container is connected to a rolling piston in an adhesive-bonded manner, in a positive-locking manner and/or in a nonpositive-locking manner. It is advantageous if both the inner wall and the outer wall of the rolling piston are connected in an adhesive-bonded manner to the supplementary volume container. This is possible particularly when the rolling piston is likewise produced from plastic. Nonpositive-locking connection of the rolling piston to the supplementary volume container is implemented when the latter is produced from a different material, e.g. metal. In particular, positive-locking connection is accomplished by stamping the rolling piston to the supplementary volume container. The rolling piston can be of single-part or of multi-part configuration.

It is advantageous if the parts are produced from a thermoplastic, in particular from a glass fiber reinforced thermoplastic. It is furthermore advantageous if the rolling piston is produced from metal or from a thermoplastic, in particular from a glass fiber reinforced thermoplastic. PA 66 GF 30 is preferably used as the thermoplastic. The parts produced from plastic contribute to a reduction in weight and an associated fuel saving. It is advantageous to use aluminum as the metal, which likewise has a relatively low weight.

Figure 1:
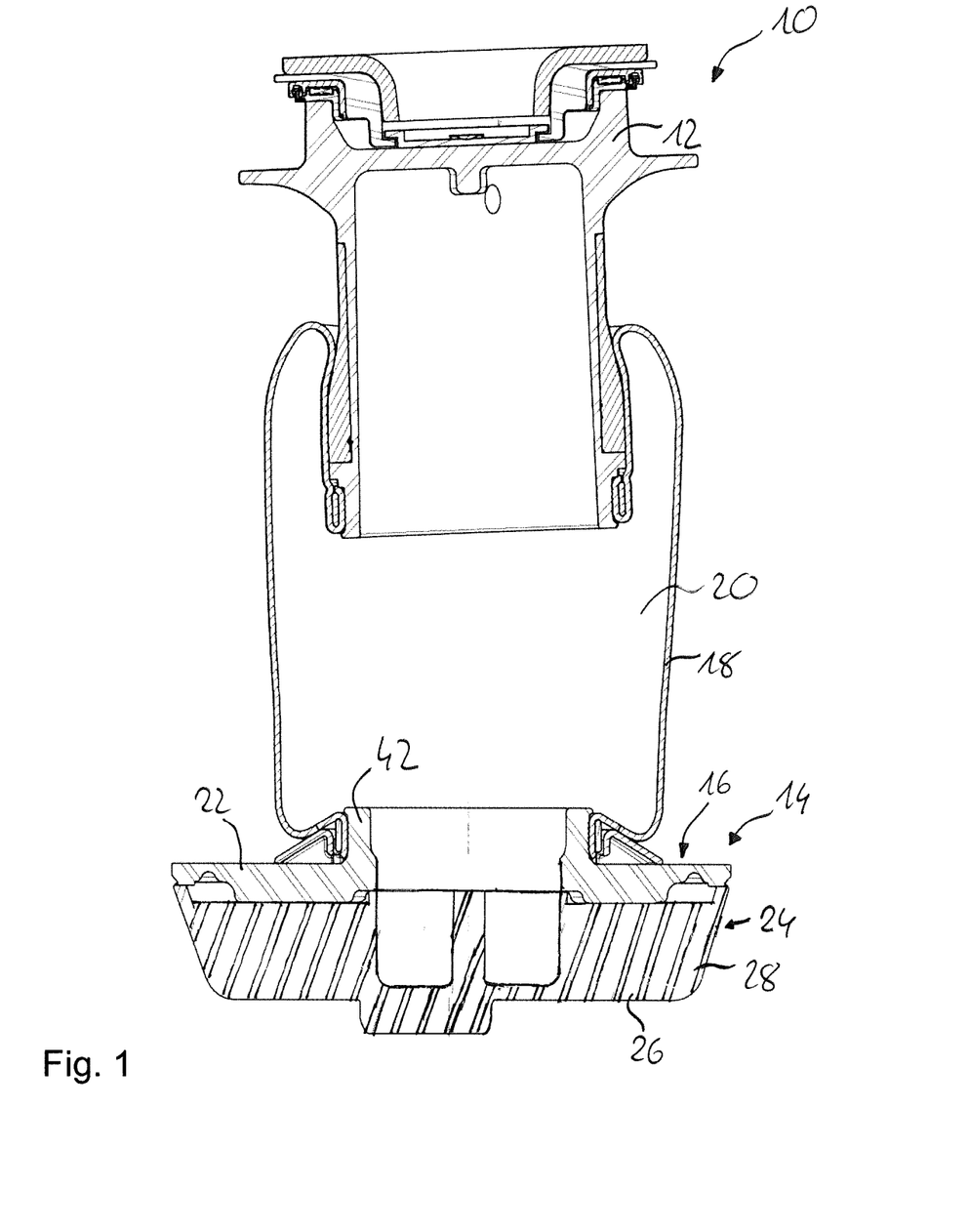
FIG. 1 shows a longitudinal section through an air spring having an air spring component according to an embodiment of the invention configured as an air spring pot.

An air spring 10, which is used in a motor vehicle between the running gear and the body, is illustrated in longitudinal section in FIG. 1.

The air spring 10 has a rolling piston 12, an air spring component 14 according to the invention, which is configured as an air spring pot 16 in the present case, and an air spring bellows 18, which is attached by means of a first free end to the rolling piston 12, forming a rolling fold, and by means of a second free end to the air spring pot 16. Here, the air spring bellows 18 forms an air-filled air spring interior 20. During a compression and rebound process, the air spring bellows 16 rolls along the outside of the rolling piston 12.

Figure 2A:
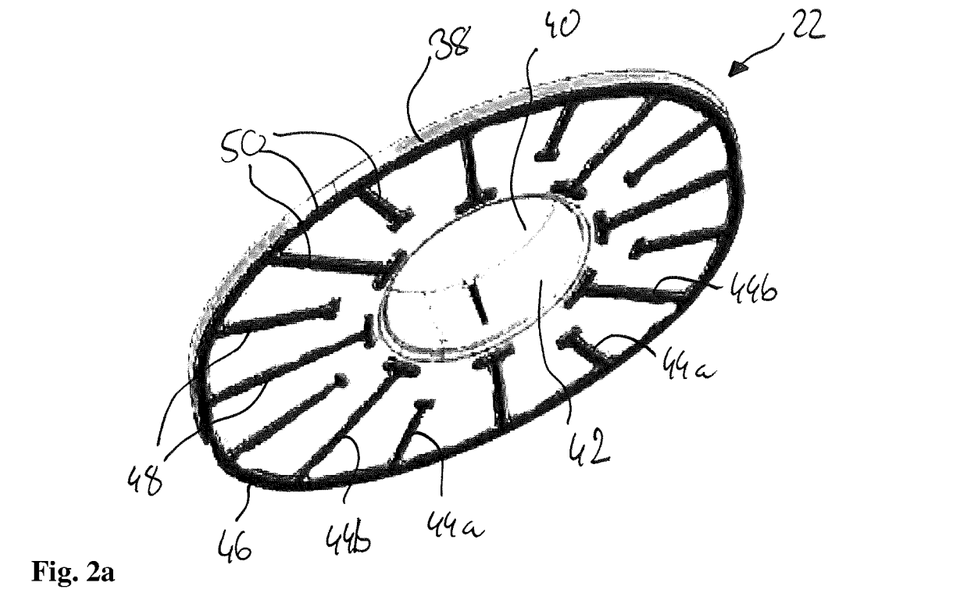
FIGS. 2a and 2b show perspective views of a top part of the air spring pot with a top part and a bottom part of the air spring pot.
Figure 2B:
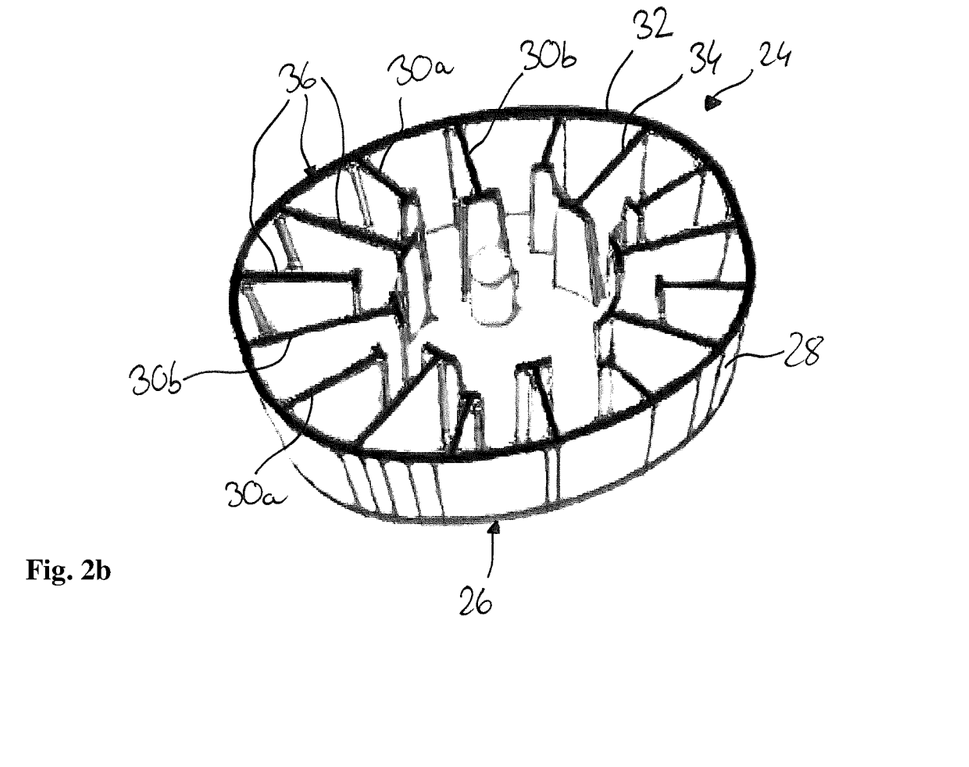

As can be seen from FIGS. 2a and 2b, the air spring pot 16 has a top part 22 and a bottom part 24. The top part 22 and the bottom part 24 are made from a glass fiber reinforced thermoplastic, in particular PA 66 GF 30, and are connected to one another in an adhesive-bonded manner by means of hot gas welding.

Here, the bottom part 24 is of approximately pot-shaped configuration and has a bottom section 26 and a housing wall 28 surrounding the bottom section 26. Extending radially inward from the housing wall 28 is a plurality of ribs 30a, 30b, which are of approximately T-shaped configuration in cross section and are connected in an adhesive-bonded manner to the bottom section 26 and the housing wall 28. As can be seen especially in FIG. 2b, a short rib 30a and a long rib 30b project alternately inward. The edge section 32 of the housing wall 28 and the free ends 34 of the ribs 30a, 30b form a first joining area 36.

The top part 22 is formed by a bottom section 38, which is pierced centrally by an opening 40 which, as can be seen in FIG. 1, is surrounded by a circular wall 42 and on which the air spring bellows 18 is secured. The bottom section 38 furthermore has webs 44a, 44b, which correspond to the ribs 30a, 30b and which extend radially inward in the direction of the opening 40 from an edge section 46 of the bottom section 38. The edge section 46 of the bottom section 38 and the free ends 48 of the webs 44a, 44b form a second joining area 50.

In the hot gas welding process, the corresponding joining areas 36, 50 are heated and/or fused or plasticized and then pressed together. After solidification of the joining areas 36, 50, the top part 22 and the bottom part 24 are connected in an adhesive-bonded manner, forming a weld seam. In the hot gas welding process, the joining areas 36, 50 are heated and/or fused or plasticized by means of a hot gas, wherein nitrogen is preferably used as the working gas. In the present case, the joining areas 36, 50 are of flat configuration.

Figures 3A, 3B, 3C:
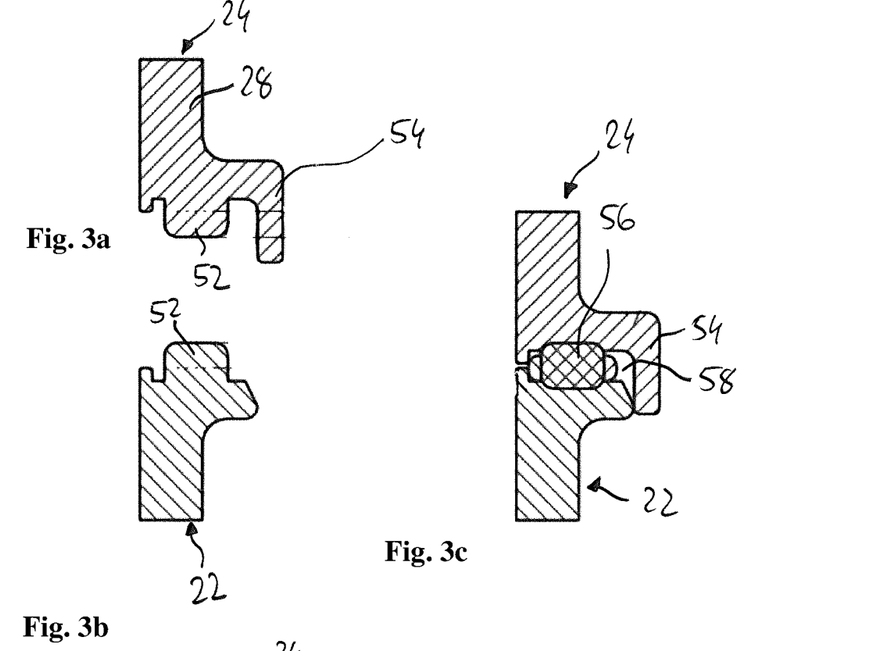
FIGS. 3a, 3b, and 3c show an enlarged detail of a longitudinal section through a joining area according to a first embodiment.

An enlarged detail of a longitudinal section through a first embodiment of the two joining areas 36, 50 is illustrated in FIGS. 3a, 3b, and 3c. The joining areas 36, 50 each have a fusible projection 52 (FIGS. 3a and 3b). Furthermore, a weld seam covering 54 projects from the housing wall 28 of the bottom part 24. In the hot gas welding process, the fusible projections 52 are heated and/or fused or plasticized and pressed together in order in this way to produce a weld seam 56 (FIG. 3c). As they are pressed together, the weld seam covering 54 makes contact with the top part 22 and, at the same time, covers a joint gap 58. As a result, no melt can escape and therefore a clean outer surface is created. It is furthermore also conceivable to arrange the weld seam covering 54 on the top part 22.

Figure 4A:
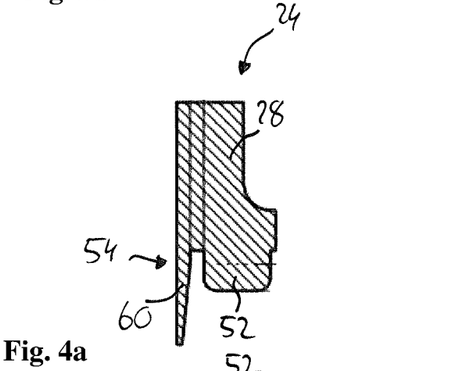
FIGS. 4a, 4b, and 4c show an enlarged detail of a longitudinal section through a joining area according to a second embodiment.
Figure 4B:
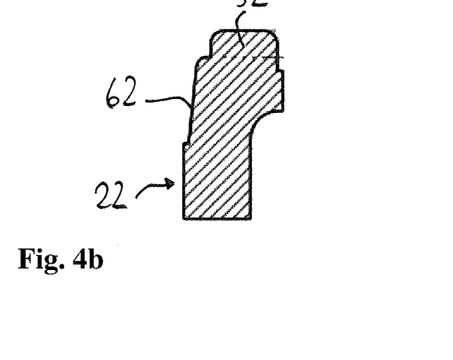
Figure 4C:
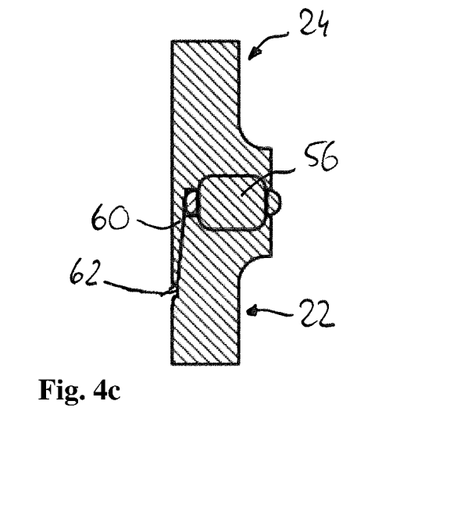

A second embodiment of the joining areas 30, 50 is illustrated in FIGS. 4a, 4b, and 4c, differing from the first embodiment in that the weld seam covering 54 is configured as a covering lip 60 which tapers to a point (left hand illustration in FIG. 4), which engages in a bevel 62 of the top part 22 after the parts are pressed together in order in this way to cover the joint gap 58. A surface that is smooth toward the outside is thereby created.

Figure 5:
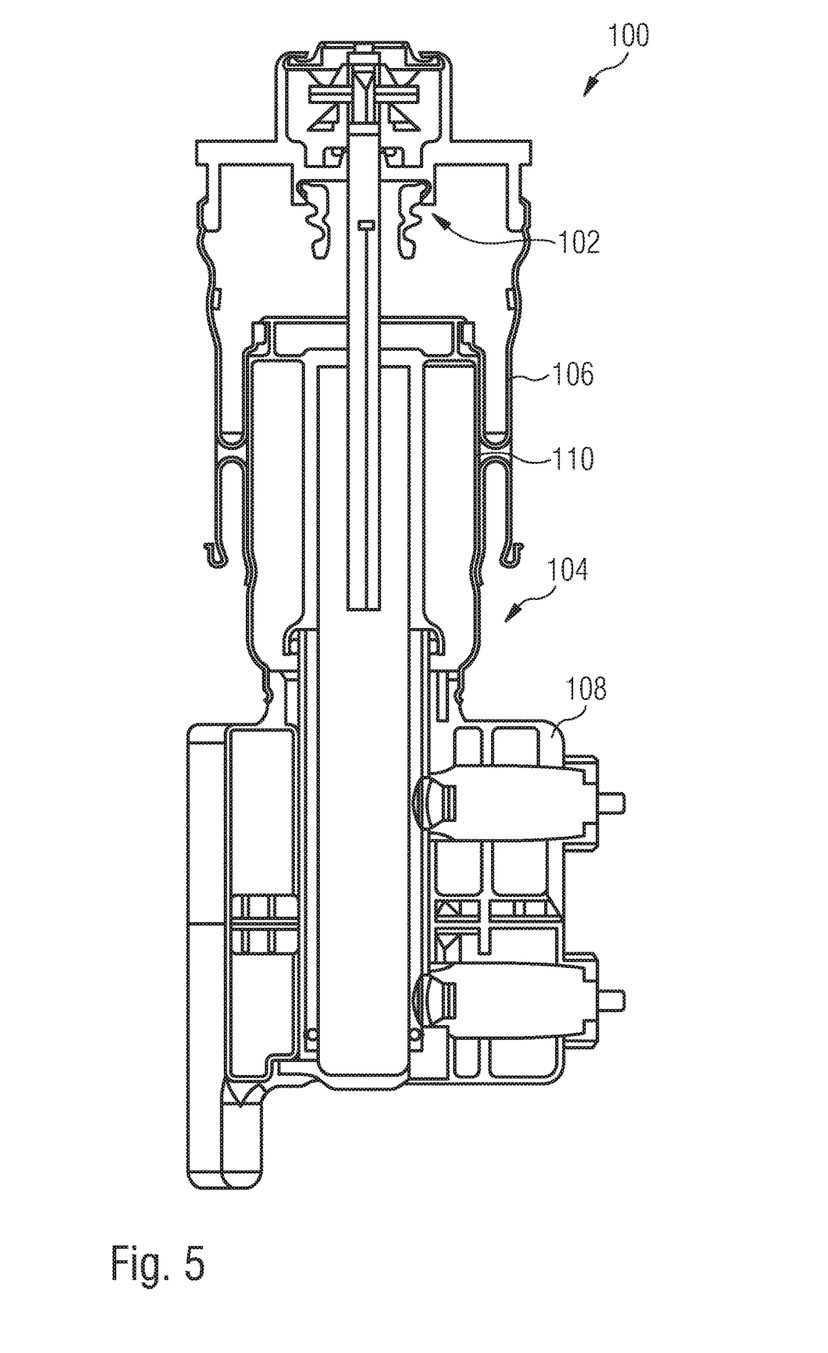
FIG. 5 shows a longitudinal section through an air spring strut having an air spring component according to an embodiment of the invention configured as a rolling piston and a supplementary volume container.

An air spring strut 100, which has a damper 102, a second air spring component 104 according to the invention, and an air spring bellows 106 connecting the damper 102 and the air spring component 104 to one another, is shown in FIG. 5.

Figure 6:
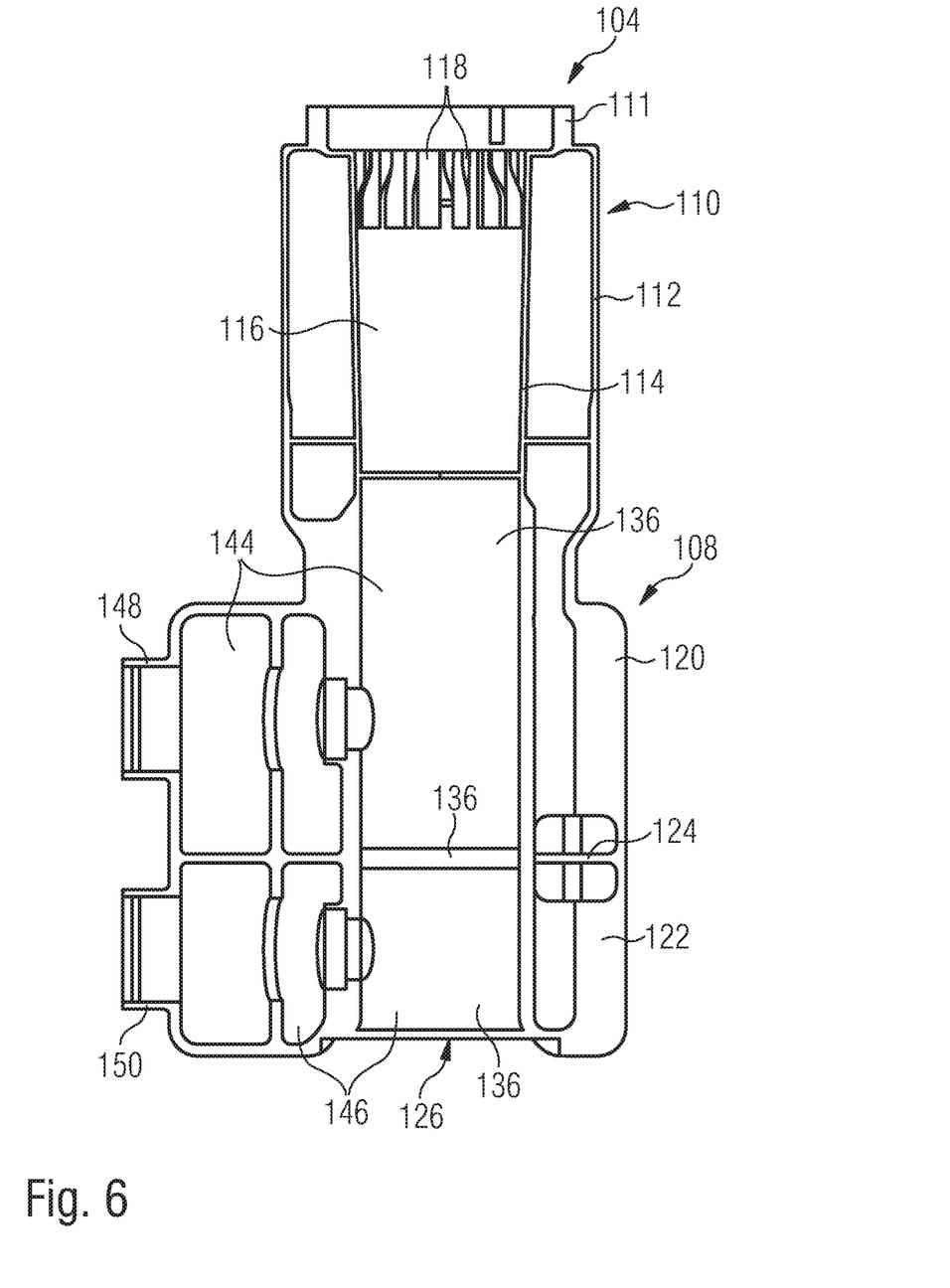
FIG. 6 shows a longitudinal section through the air spring component, which is configured as a rolling piston and a supplementary volume container.
Figure 8A:
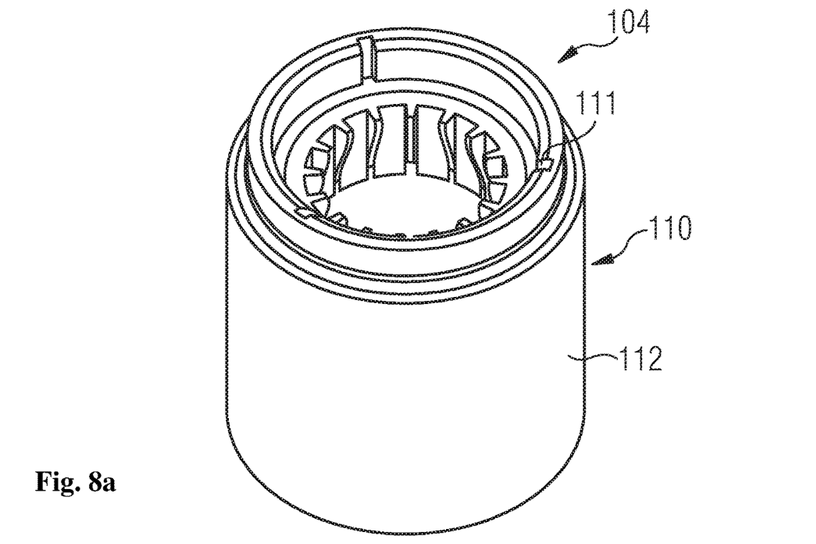
FIGS. 8a and 8b show perspective views of a rolling piston and a supplementary volume container of an air spring component.
Figure 8B:
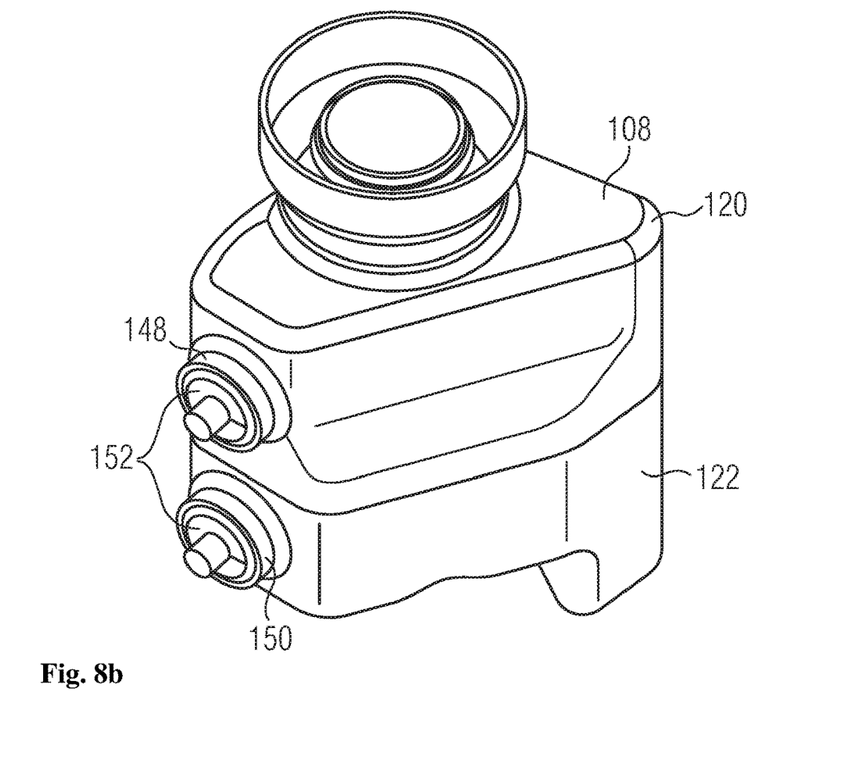

As can be seen, in particular, in FIGS. 6 and 8, the air spring component 104 has a supplementary volume container 108 and a rolling piston 110, which are connected to one another in an adhesive-bonded manner by means of hot gas welding.

In the present case, the rolling piston 110 is embodied with a double wall and has a fastening section 111 for fastening the air spring bellows 106, an outer wall 112, which serves as a rolling contour for the air spring bellows 106, and a boundary wall 114. By means of the double-walled configuration of the rolling piston 110, a switching volume is formed between the outer wall 112 and the boundary wall 114. The air spring bellows 106 is clamped on the fastening section 111 by means of a clamping ring. Furthermore, the rolling piston is provided with a central passage 116 for accommodating the damper 102. For radial guidance of the damper 102, the rolling piston 110 has ribs 118 at the end. In the present case, the rolling piston 110 is embodied as a single part. Furthermore, the rolling piston 110 can also be formed in two parts by a top part and a rolling piston part, which are connected to one another in an adhesive-bonded manner by means of hot gas welding.

The rolling piston 110 is connected in an adhesive-bonded manner to the supplementary volume container 108 by hot gas welding, as explained above. In particular, the free end of the outer wall 112 and the free end of the inner boundary wall 114 are connected in an adhesive-bonded manner to the supplementary volume container 108.

Figure 7A:
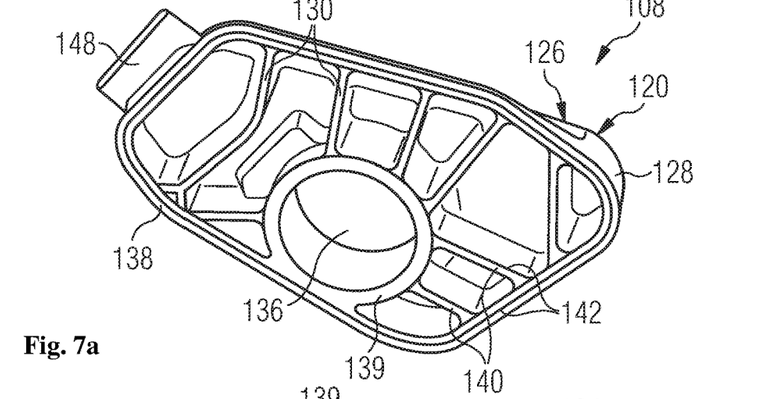
FIGS. 7a, 7b, and 7c show perspective views of the individual parts of the supplementary volume container.
Figure 7B:
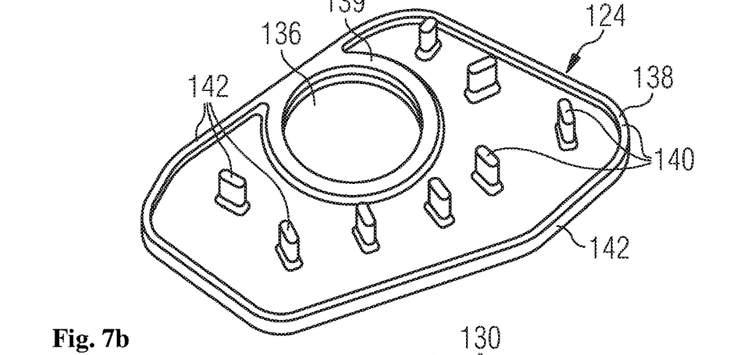
Figure 7C:
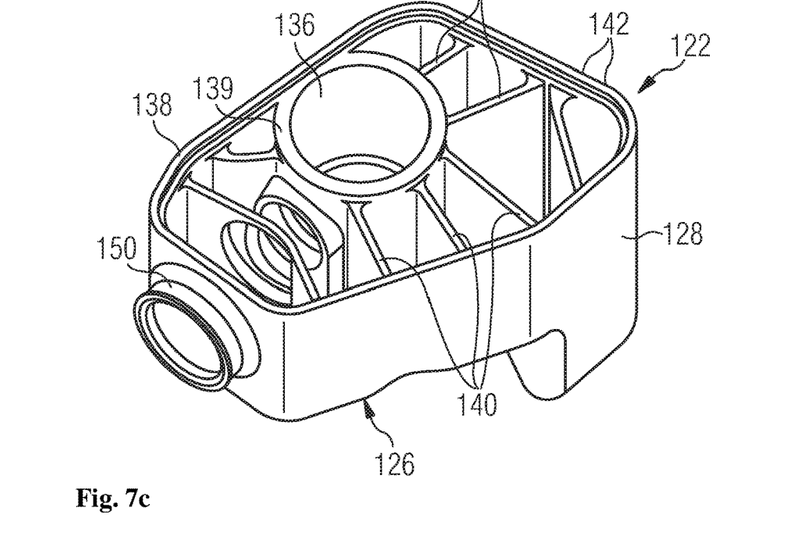

According to FIGS. 7a, 7b, and 7c, the supplementary volume container 108 has a top part 120, a bottom part 122 and a dividing wall 124 arranged therebetween. The top part 120 and the bottom part 122 are of approximately pot-shaped configuration and comprise a bottom section 126, a housing wall 128 and ribs 130, which project radially inward from the housing wall 128. The dividing wall 124 has webs 132, which correspond to the ribs 130 and which project in an axial direction on both sides of the dividing wall 124. Moreover, the top part 120, the dividing wall 124 and the bottom part 122 each have a passage 136, which coincide with the passage 116 in the rolling piston 110 in the assembled state in order to form a receptacle for the damper 102.

The top part 120, the bottom part 122 and the dividing wall 124 are connected in an adhesive-bonded manner by means of hot gas welding, as explained above. The edge sections 138, the rims 139 of the passages 136, the free ends 140 of the ribs 130 or webs 132 each form a joining area 142. The joining areas 142 can be of flat or three-dimensional configuration, as illustrated in FIGS. 3 and 4. A weld seam covering 54 of the kind illustrated in FIGS. 3 and 4 can furthermore be provided to cover a joint of the housing wall 128 of the top part 120 and/or bottom part 122.

The dividing wall 124 divides the supplementary volume container 108 into a first chamber 144 and a second chamber 146. The first chamber 144 has a first valve seat 148, which is introduced into the housing wall 128, and the second chamber 146 has a second valve seat 150, which is introduced into the housing wall 128. As illustrated in FIGS. 8a and 8b, switching valves 152 are integrated into the valve seats 148, 150 in order to control the switching volume in the chambers 144, 146. As illustrated in FIG. 6, the switching volume of the first chamber 144 is connected to the switching volume of the rolling piston 110 and thus permits a larger switching volume and hence a greater variation of the air spring stiffness between the different switching positions.

In the embodiment of the air spring component 104 shown in FIGS. 5 to 8, both the rolling piston 110 and the supplementary volume container 108 are produced from a glass fiber reinforced thermoplastic, in particular PA 66 GF 30.

Figure 9:
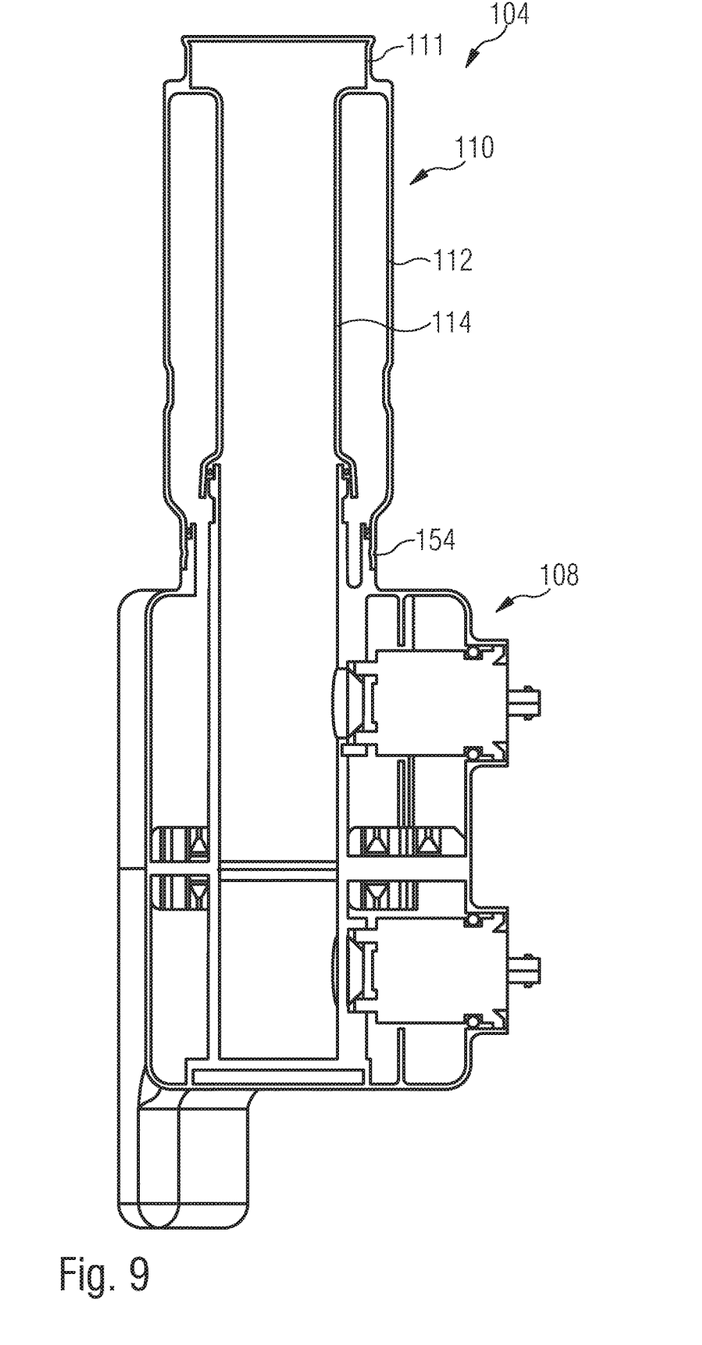
FIG. 9 shows a longitudinal section through an air spring component according to an embodiment of the invention configured as a supplementary volume container and through a rolling piston made of metal, which are connected to one another by means of stamping.

FIG. 9 illustrates another embodiment of the air spring component 104, which differs from the air spring component 104 illustrated in FIGS. 5 to 8 in that the rolling piston 110 is produced from metal, in particular aluminum, wherein a positive-locking and/or nonpositive-locking connection is used instead of the adhesive-bonded connection to the supplementary volume container 108. In the embodiment illustrated in FIG. 9, the rolling piston 110 is connected to the supplementary volume container 108 by means of a stamped feature 154.

The air spring component 14, 104 according to the invention is distinguished by the adhesive-bonded connection of the components produced from plastic by means of hot gas welding. As a result, the air spring components 114, 104 meet the requirements made on pressurized air spring parts as regards leaktightness, component strength, temperature stability and aging resistance.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 air spring
12 rolling piston
14 air spring component
16 air spring pot
18 air spring bellows
20 air spring interior
22 top part
24 bottom part
26 bottom section
28 housing wall
30a short rib
30b long rib
32 edge section
34 free end
36 first joining area
38 bottom section
40 opening
42 wall
44a short web
44b long web
46 edge section
48 free end
50 second joining area
52 fusible projection
54 weld seam covering
56 weld seam
58 joint gap
60 covering lip
62 bevel
100 air spring strut
102 damper
104 air spring component
106 air spring bellows
108 supplementary volume container
110 rolling piston
111 fastening section
112 outer wall
114 boundary wall
116 passage
118 ribs
120 top part
122 bottom part
124 dividing wall
126 bottom section
128 housing wall
130 rib
132 web
136 passage
138 edge section
139 rim
140 free end
142 joining area
144 first chamber
146 second chamber
148 first valve seat
150 second valve seat 152 switching valve
154 stamped feature

The invention claimed is:

1. An air spring component, comprising:
a rolling piston;
a supplementary volume container for the rolling piston, the supplementary volume container including a top part having first joining areas and a bottom part having second joining areas; and
an adhesive bond connecting the first and second joining areas to one another;
wherein the joining areas are formed from at least one of corresponding edge sections, ribs, and webs of the parts.

2. The air spring component according to claim 1, wherein at least one of the top part and the bottom part includes a weld seam covering, which covers a joint gap.

3. The air spring component according to claim 2, wherein the weld seam covering protrudes from a first of the top part and the bottom part and rests in a corresponding recess on a second of the top part and the bottom part.

4. The air spring component according to claim 1, wherein at least one of the ribs and the webs project radially inward or outward from a housing wall of the parts.

5. The air spring component according to claim 1, wherein at least one of the webs and the ribs have an approximately T-shaped basic shape.

6. The air spring component according to claim 1, wherein the joining areas include fusible projections.

7. An air spring component, comprising:
a bottom part;
a top part; and
a dividing wall arranged between the bottom part and the top part,
wherein the dividing wall connects corresponding joining areas of the bottom part and the top part in an adhesive-bonded manner to form a supplementary volume container, and
wherein the top part, the dividing wall, and the bottom part each has a passage that coincides with a passage in a rolling piston.

8. The air spring component according to claim 7, wherein at least one of the rolling piston and the supplemental volume container includes a thermoplastic.

9. The air spring component according to claim 8, wherein at least one of the rolling piston and the supplemental volume container includes a glass fiber reinforced thermoplastic.

10. The air spring component according to claim 7, wherein the top part is connected by a second adhesive-bond to the rolling piston.

11. The air spring component according to claim 7, wherein the supplementary volume container is connected to the rolling piston in at least one of an adhesive-bonded manner, a positive-locking manner, and a nonpositive-locking manner.

12. The air spring component according to claim 7, wherein the dividing wall includes webs that correspond to ribs of at least one of the top part and the bottom part.

13. The air spring component according to claim 7, further comprising a rolling piston.

14. A method for producing an air spring component, comprising:
providing a first part and a second part having corresponding joining areas;
connecting the corresponding joining areas of the first part and the second part to one another in an adhesive-bonded manner in an inert atmosphere via hot gas welding,
wherein a hot gas used during the hot gas welding forms the inert atmosphere.

15. The method for producing an air spring component according to claim 14, further comprising heating the joining areas by infrared radiation, mirror heating, and/or induction.

16. The method for producing an air spring component according to claim 14, wherein the hot gas is Nitrogen and wherein the inert atmosphere is the Nitrogen gas.

* * * * *